United States Patent [19]
Houghton

[11] 3,816,051

[45] June 11, 1974

[54] APPARATUS FOR FORMING ARTICLES FROM PLASTIC SHEET MATERIAL

[75] Inventor: Norman F. Houghton, Connersville, Ind.

[73] Assignee: Philco-Ford Corporation, Philadelphia, Pa.

[22] Filed: July 13, 1973

[21] Appl. No.: 378,839

Related U.S. Application Data

[62] Division of Ser. No. 235,968, March 20, 1972, Pat. No. 3,781,394.

[52] U.S. Cl. .................... 425/388, 264/89, 264/92, 264/93, 264/318, 425/DIG. 58, 425/383
[51] Int. Cl. ............................................. B29c 17/04
[58] Field of Search .... 425/388, 326, 387, DIG. 58, 425/383; 264/89, 90, 92, 93, 96, 94, 98, 292, 318

[56] References Cited
UNITED STATES PATENTS

| | | | |
|---|---|---|---|
| 3,368,243 | 2/1968 | Kohen | 425/388 |
| 3,574,807 | 4/1971 | Heavener | 425/388 X |
| 3,577,593 | 5/1971 | Jackson | 425/388 |
| 3,597,799 | 8/1971 | Earle | 425/388 X |

*Primary Examiner*—Robert L. Spicer, Jr.
*Attorney, Agent, or Firm*—Robert D. Sanborn; Harry W. Hargis, III

[57] ABSTRACT

A vacuum-forming operation in which a pair of adjacent compartment liners are formed from a single sheet of thermoplastic material. In the apparatus aspect, a pair of adjacent molds, each affording the desired shape of the inside surface of the corresponding liner to be formed, are mounted along their base portions on frame structure hinged in the region of adjacency of the mold base portions, to provide for pivotation of the base portions so that confronting surfaces of the molds are movable angularly toward and away from one another. One of the molds includes an auxiliary section disposed inwardly thereof, and mounted for selective extensible movement into the region of adjacency of the molds. In the method aspect, a sheet of thermoplastic material is disposed to extend over the molds, and is heated, causing it to soften while the molds are held in pivoted position in which the confronting surfaces are substantially spaced from one another. Mold assist-plugs and the molds are then moved, relative to one another, to urge the sheet into general close conformity with the molds. While the sheet of material is still soft, the assist-plugs further are caused to engage the mold frame structure, through the intermediacy of the sheet, pivoting the frame structure and causing adjacent wall portions of the molds to move toward one another and assume their closely spaced position. Air entrapped between the heated sheet and the walls of the mold not provided with the auxiliary section is then evacuated through a number of small ports or vents in the walls, thereby forming one of the desired liners, whereupon the auxiliary section of the other mold is projected and air entrapped between the heated sheet and the mold is evacuated, forming the other of the desired liners with an undercut region. The liners are then cooled, the extended auxiliary mold section is retracted from the undercut region, and the liners are stripped as a unit from the molds.

3 Claims, 9 Drawing Figures

APPARATUS FOR FORMING ARTICLES FROM PLASTIC SHEET MATERIAL

This is a division of application Ser. No. 235,968, filed Mar. 20, 1972, now U.S. Pat. No. 3,781,394.

CROSS REFERENCE TO RELATED DISCLOSURE

This invention is directed to improvements in the method and apparatus disclosed and claimed in my co-pending U.S. patent application Ser. No. 73,761, filed Sept. 21, 1970, now U.S. Pat. No. 3,709,968 and assigned to the assignee of the present invention.

BACKGROUND OF THE INVENTION

This invention relates to the formation of articles from sheets of thermoplastic material, and is more particularly concerned with an improved method and apparatus for forming deep-drawn shapes, for example food storage compartment liners for refrigerator cabinets.

In producing an article of the aforementioned type, it is known to bring an assist-plug into contact with a heat-softened sheet of thermoplastic material to urge portions thereof onto adjacent forming molds, after which the material is subjected to a vacuum, while in its heat-softened state, to achieve the desired shape. In the fabrication of liners for dual compartment refrigerators it has been desired to mold the liners from a single sheet, but it has been found difficult to achieve undercut regions in planar portions of the sheet, especially in the region of adjacency of the liner walls due to the close spacing therebetween.

It is a general objective of this invention to provide an improved mold structure and vacuum-forming method which overcomes the above mentioned difficulties, and which structure and method are especially useful in the formation of vertically stacked, dual compartment cabinet liners.

SUMMARY OF THE INVENTION

In achievement of the foregoing as well as other objectives, the invention contemplates a novel method and apparatus for forming from a single sheet of thermoplastic material dual compartment liners having unidirectionally presented openings, one of which liners includes an undercut recess in one of its walls. The invention is particularly characterized by the provision of a pair of adjacent, substantially unidirectionally presented molds one having the desired shape of one of the liners to be formed, and having vented wall sections. The other mold also is vented, and includes a section nested therein that is selectively extensible into the space between the molds, whereby, together with the mold, it affords the desired shape of the other liner to be formed. The molds are mounted along base portions thereof on frame structure so hinged, in the region of adjacency of said base portions, as to provide for pivotation of the molds between a position in which confronting surfaces thereof are more widely spaced and a position in which the surfaces are more closely spaced. An assist-plug confronts the molds, and the plug and molds are relatively movable toward and away from one another in telescoping relationship.

In formation of a pair of liners, a sheet of thermoplastic material is placed between the assist-plug and the molds. The sheet of material is then heated causing it to soften while the molds are held in their pivoted positions in which the confronting surfaces are more widely spaced. The assist-plug and mold structures are then moved relative to one another, to engage the heat-softened sheet and urge it onto the molds. This movement is followed by interengagement of the two structures to urge the molds to non-pivoted, liner-forming position in which the confronting surfaces of the molds are in relatively closely spaced position. Air entrapped between the heated sheet and the mold not provided with the extensible section is then removed through large number of vents, or ports, in the walls thereof, thereby forming one of the desired liners. Immediately, the auxiliary section of the other mold is projected, and air entrapped between the heated sheet and the other mold and its auxiliary section is evacuated, forming the other of the desired liners and its undercut region. Both liners are then cooled, the extended auxiliary section is retracted from the undercut region, and the liners are stripped from the molds.

For a further understanding of the invention, and the manner in which the objectives and advantages thereof may best be achieved, reference is made to the following description, taken in light of the accompanying drawing.

DESCRIPTION OF THE PREFERRED PRACTICE AND APPARATUS

Figure 1:
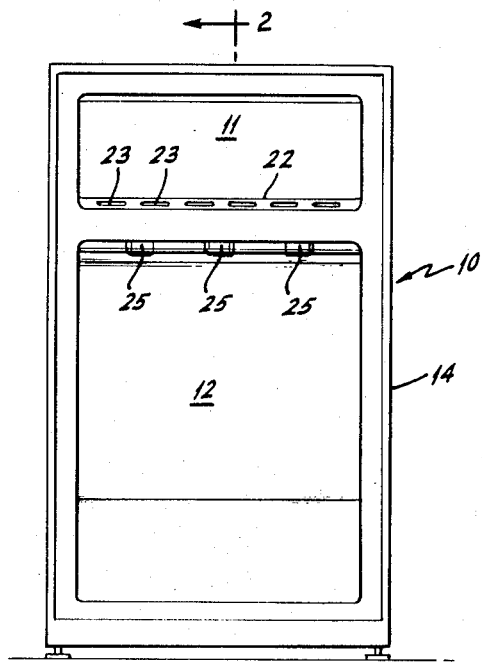
FIG. 1 is an elevational showing of refrigerator cabinet structure of a type embodying a pair of compartment liners made in accordance with the invention, and with the doors removed for convenience of illustration.
Figure 2:
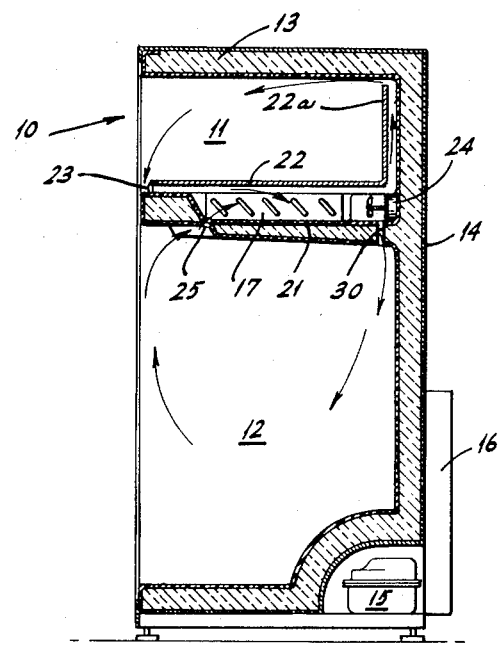
FIG. 2 is a sectional showing of the cabinet structure taken generally along the line indicated by arrows 2—2 applied to FIG. 1.

With reference to FIGS. 1 and 2, a refrigerator cabinet 10 has a pair of compartments having unidirectionally presented openings, and defined by a pair of liner sections 11 and 12. The liner sections are made of a thermoplastic material, and are molded as an integral structure from a single flat sheet of such material, in accordance with the invention to be described in detail below. Thermal insulation designated generally by the numeral 13, and which may for example be of the foamed type, fills the spaces between the confronting walls of liner sections 11 and 12, and between the outer walls of the same sections and the walls of outer shell 14 of cabinet 10. It will be understood, of course, that other well known suitable types of thermal insulation may be used.

The refrigerating unit is conventional, comprising a compressor 15, condenser 16, and an evaporator 17 connected in the usual series flow circuit by suitable conduit means (not shown). Evaporator 17 is conveniently located in a recessed portion 21 of upper liner section 11, and a partition 22 includes a horizontal section that extends over the recess and the evaporator.

It will be appreciated that it has heretofore been found difficult to mold recessed portion 21, and the present invention is featured by a novel method and apparatus for molding liner structure including such an undercut section. Further to the exemplary refrigerator construction, partition 22 is provided with front air passages 23, and a vertical section 22a of the partition is spaced from the top and rear walls of liner section 11 as shown. Air moved by a blower 24 disposed in the rear portion of recess 21 is caused to flow into the freezer storage compartment defined by liner section 11, through the space between the liner and partition 22a, thence returns to the region of evaporator 17 through front passages 23. The lower food storage compartment, defined by liner section 12, is cooled by air caused to move from the compartment through passages 25, over evaporator 17, thence back into the compartment through passages 30.

From what follows, it will be appreciated that the present invention overcomes problems arising from: the characteristically close spacing between the above-described upper and lower liner sections 11 and 12, which heretofore has made it difficult to vacuum-form the confronting top and bottom walls of the liners, due particularly to the relatively small amount of thermoplastic material available in the blank sheets for the relatively deep draw required in this region; and the fact that the recessed portion 21 of the upper liner section 11 comprises an undercut section, making it difficult to provide mold structure from which the molded liners may be easily stripped.

Figure 3:
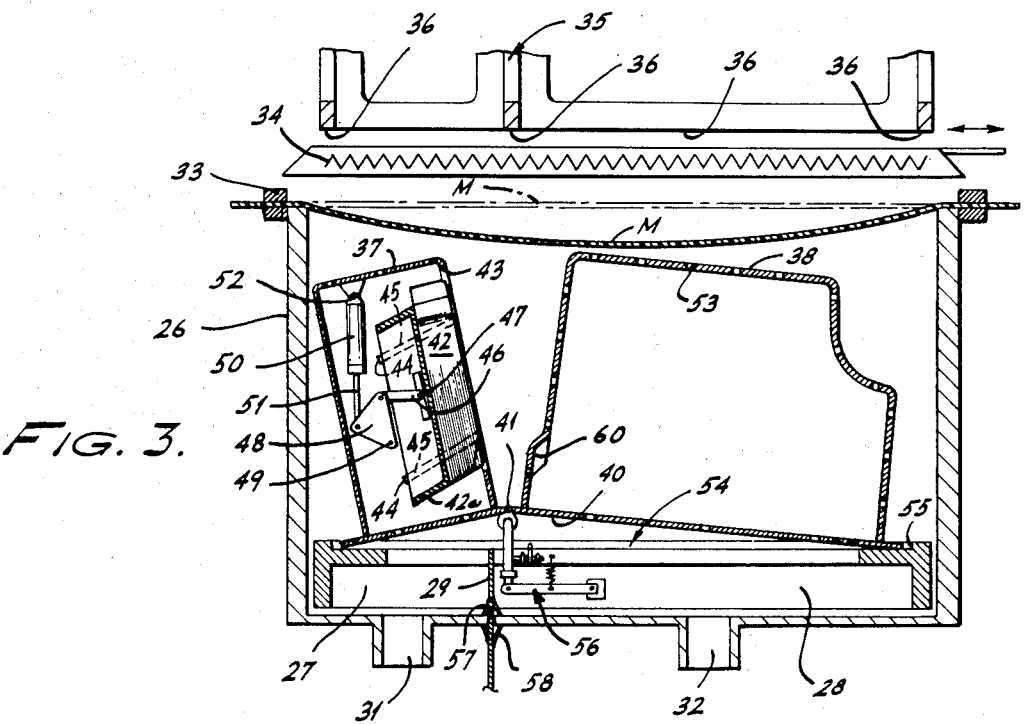
FIG. 3 is a sectional-elevational view of mold apparatus for fabricating the compartment liners of the cabinet seen in FIGS. 1 and 2.

Turning now to apparatus for forming liners 11 and 12 in accordance with the invention, and first with reference to FIG. 3, an open top, generally box-shaped chamber 26 includes a pair of sub-sections 27 and 28, each separated from the other by a partition 29 and each ported, at 31 and 32 respectively, to suitable vacuum producing mechanism of conventional design (not shown). A clamping ring 33 closely surrounds the upper rim of vacuum chamber 26, and is constructed and arranged to clamp in place a sheet of thermoplastic material M (broken line showing) that extends over the upper rim of chamber 26. A radiant heater 34 is arranged to overlie the sheet to heat the same, and is mounted for lateral movement (see horizontal arrows) between the illustrated extended position and a retracted position in which it is removed from above the sheet. An assist plug 35 of generally rectangular shape is disposed above heater 34 and has slightly rounded peripherally extending edge portions 36. In the illustrated embodiment, relative movement between the plug and the mold is provided for by mounting both assist plug 35 and the molds 37 and 38 for vertical movements, into and out of telescoping relationship, as will be described in detail. No apparatus for mounting assist plug 35 has been shown, since this apparatus can be entirely conventional in nature.

Each of the adjacently positioned, generally unidirectionally presented molds 37 and 38 is shaped to yield the general box shape of the inside surfaces of the respective liner sections 11 and 12 to be molded. Molds 37 and 38 are mounted along their base portions on articulated frame structure 40 hinged at 41 in the region of adjacency of the mold base portions. Use of two molds, and of hinged mold-supporting frame structure, is in accordance with the copending disclosure identified above. In especial accordance with the present invention, the left hand, smaller mold 37 includes an auxiliary section 42 conveniently shown in full lines, and nested in mold 37 for selective extensible movement through opening 43 into the space between the molds 37 and 38, whereby in extended position it affords, together with mold 37, the desired shape of the smaller liner section 11 to be formed, as will be described in detail in an ensuing discussion of the operation of the mold apparatus.

Figure 6:
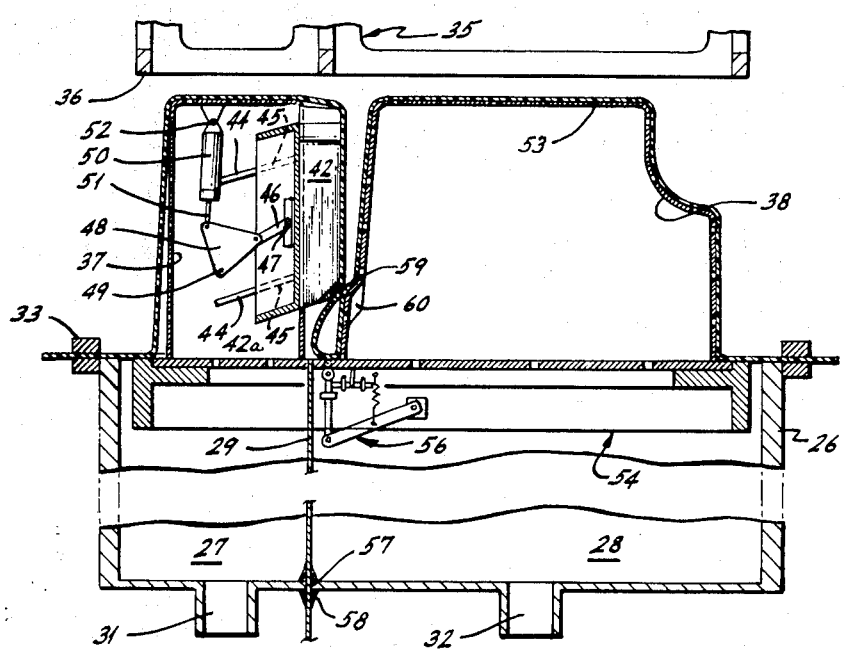
Figure 9:
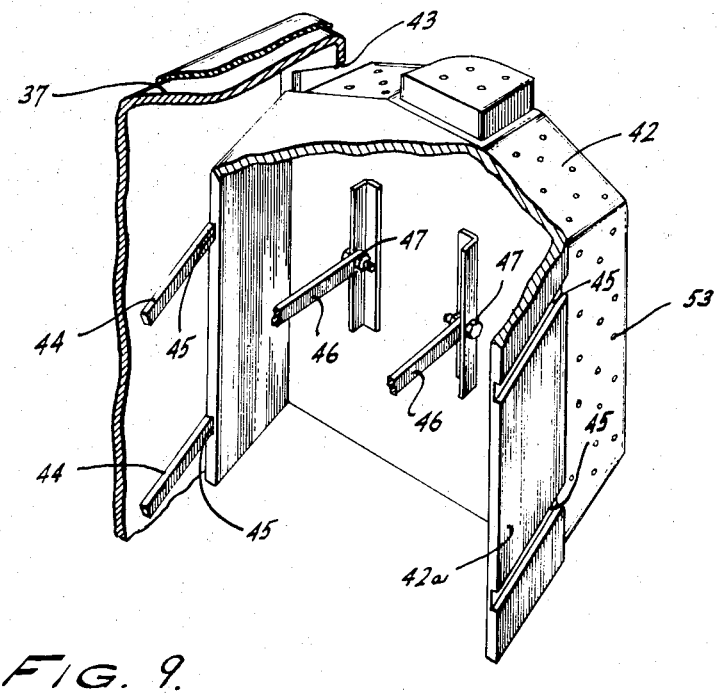
FIG. 9 is a perspective showing of a fragmented portion of the left hand mold section of the mold apparatus seen in FIGS. 3 to 8.

As is seen to further advantage in FIG. 9, movements of auxiliary mold section 42 are afforded by a set of runners 44 on mold 37 that are slidably interengaged with a set of grooves 45 on a base portion 42a of the auxiliary mold section. Means for moving mold section 42 to and from its extended position on runners 44 includes a pair of links 46, each pinned to the mold section at 47 and to a pair of spaced bell cranks 48 that are pivoted at 49 to mold 37. Bell cranks 48, only one of which is illustrated in FIG. 3 for the sake of convenience, further are pinned to the piston rod 51 of a pneumatic cylinder 50. The cylinder is pivoted at 52 to mold 37, and the construction and arrangement of the mechanism thus far described is such that extension of piston rod 51, by suitable introduction of pressurized air in cylinder 50, will rock crank 48 about its pivot 49 in a counterclockwise direction to move link 46 to the left and retract auxiliary mold section 42 to the position seen in FIG. 3. Conversely, retraction of piston rod 51 rocks crank 48 about pivot 49 in a clockwise direction, moving link 46 to the right and extending mold section 42 to the position seen in FIGS. 6, 7 and 9.

Frame structure 40 is ported, and molds 37, 38 and 42 are provided with large numbers of vents or ducts of a type appearing on enlarged scale at 53. Frame structure 40 further is supported for both sliding and pivotal movements on a generally rectangular open support frame 54 having a peripheral rim 55 that both confines and positions the molds. Support frame 54 is elevatable from the position shown in FIG. 3 to the upper position shown in FIG. 5, in which upper position the level of the frame structure 40, and mold base portions thereon, is substantially at the level of the upper edge of vacuum chamber 26. Conveniently, the upwardly pivoted position of frame structure 40 is maintained by mechanism including linkage means 56 described in the referenced copending application, and which need not be described for an understanding of the present invention.

In further and more detailed accordance with the invention, partition 29 which divides chamber 26 is mounted to extend across and depend from frame support 54. Partition 29 further is slidably sealed, by suitable known means (not shown) to side walls of chamber 26, and is movable through a slot 57 in a lower, horizontal wall of the chamber, which slot 57 is rendered airtight by gasket means 58 that wipes the surface of partition 29. Suitable valving (not shown) is provided for vacuum ports 31 and 32 so that vacuums can be drawn independently on one or the other of the molds 37, 38, by way of corresponding chamber sections 27 and 28 communicating therewith.

Figure 4:
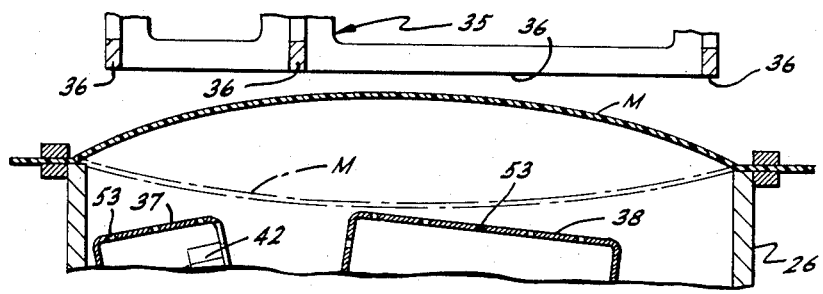
FIG. 4 is a further showing of a portion of the apparatus seen in FIG. 3, and illustrating operational features thereof.

In formation of a pair of liners 11 and 12, and again with reference to FIG. 3, a sheet of thermoplastic material, shown in broken lines at M, is placed between assist plug 35 and molds 37, 38. The sheet of material is then heated, causing it to soften and sag substantially to the position seen in broken lines at M, while molds 37 and 38 are held in their pivoted positions in which the confronting surfaces are more widely spaced. Heater 34 is then withdrawn, as is illustrated in FIG. 4, and the sagged sheet M (broken lines) is billowed upwardly to the position M (full lines) by application of slight, positive air pressure to chamber 26.

Figure 5:
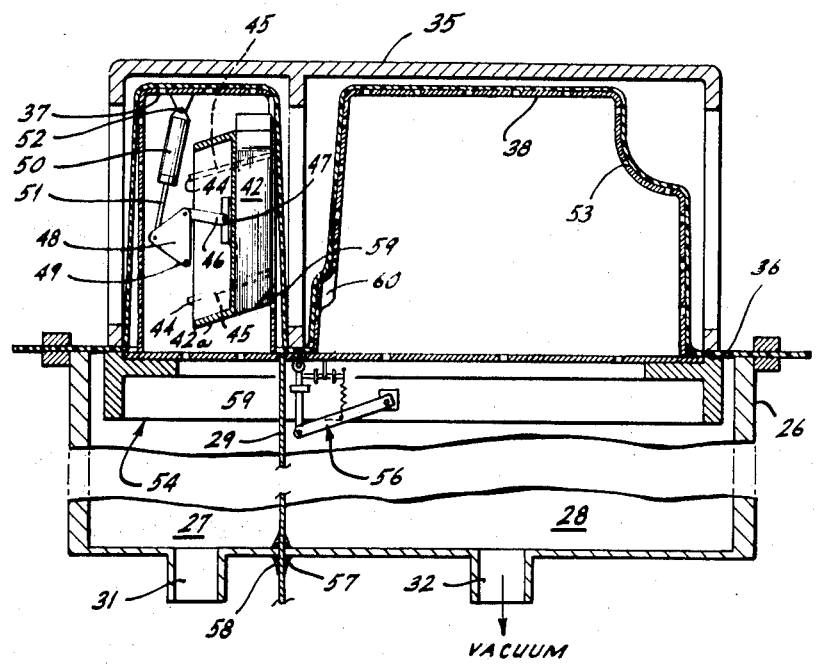
FIGS. 5 to 8 are additional views of the apparatus illustrated in FIGS. 3 and 4, and showing still further operational features thereof.
Figure 7:
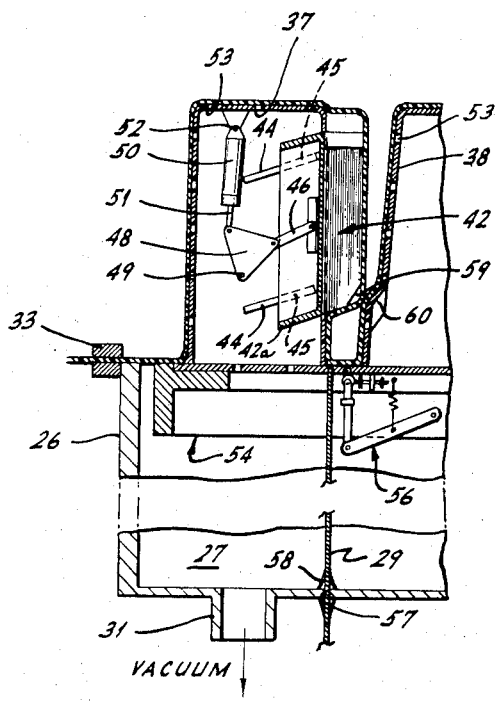
Figure 8:
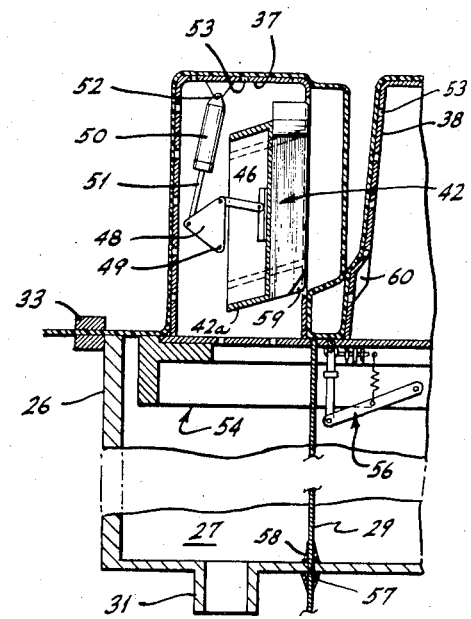

The assist plug and the molds are then moved relative to one another, to engage the heat softened sheet and urge it onto the molds 37, 38, while auxiliary mold section 42 is held in its illustrated retracted position. This movement, which is not illustrated, is then followed by interengagement of the two structures to urge the molds to non-pivoted, liner-forming position in which the confronting surfaces of molds 37, 38 are relatively closely spaced as is seen in FIG. 5. The left hand portion of the sheet is then draped over the mold 37, but does not conform closely thereto, particularly in the lower areas. Still with reference to FIG. 5, a vacuum is created in right hand chamber 28 by way of port 32, whereupon air entrapped between the heated sheet and right hand mold 38 is removed through the large number of vents or ports 53 in the walls thereof, thereby causing the right hand sheet portion to conform to the mold 38 and form the desired liner section 12, on mold 38, as shown. Immediately, and with reference to FIG. 6, the auxiliary section 42 of mold 37 is projected to its extended position by introducing pressurized air into the lower end of air cylinder 50 to rock crank 48 in a clockwise direction. As is seen in FIG. 7, and while auxiliary section 42 is held in its extended position, air entrapped between the heated sheet and mold 37, and its auxiliary section 42, is then evacuated to cause conformity to the mold 37 and thereby to form the desired liner section 11 and its undercut region 21 (FIG. 2). As is seen in FIG. 8, liner sections 11 and 12 are then cooled, the extended auxiliary mold section 42 is retracted from the undercut region of liner section 11, and the integrally formed liner sections are ready for stripping from the molds.

The method and apparatus contemplated by the invention readily accommodates formation of communicating passages between the upper and lower refrigerator compartments. Examples of such passages are the forward air passages 25 seen in FIGS. 1 and 2. These passages are provided for by confronting spaced protrusions 59 and 60 on molds 37 and 38, respectively. As will best be understood from FIGS. 6, 7, and 8, protrusions 59 and 60 cause overlying regions of the heated thermoplastic sheet to engage and thereafter permanently to adhere to one another. These regions of adherence are then pierced in suitable manner, following foaming in place of the insulation 13 shown in FIG. 2. Additional passages, such as the one designated by the numeral 30, may be formed by drilling through confronting liner walls and the interposed insulation 13.

While the invention has been described in connection with the formation of refrigerator compartment liners, it will be understood that the invention as claimed contemplates the formation of dual compartmented structures, generally, having undercut sections in wall portions thereof. Also, it will be understood that pressurized equipment may be used in place of the vacuum apparatus as shown and described for the application of differential fluid pressure to the softened thermoplastic sheet.

I claim:

1. In apparatus for forming a deep drawn plastic article having a pair of adjacent walled structures, said apparatus being of the type including a pair of spaced molds having outer surface portions corresponding to the shape of the article to be formed, an assist-plug structure at least a portion of which is insertable into the space between said molds, means for supporting a heat-softened sheet of thermoplastic material between said molds and said assist-plug structure, means for effecting relative movement between said molds and said assist-plug structure to cause them to bear against said sheet, means for producing a pressure differential across opposite surface portions of said sheet to cause it to conform to the surface of said molds, means for movably mounting said molds so that in one position thereof confronting mold wall sections are closely spaced, and in another position said wall sections are substantially spaced, means for maintaining said molds in said other position as said molds and said assist-plug are moved together against said sheet, and means for moving said molds to said one position prior to operation of said means for producing the recited pressure differential, the improvement comprising: an auxiliary mold section disposed within one of said spaced molds, and mounted for selective extensible and retractible movements respectively from and to its position within said one mold, said auxiliary mold section in its extended position presenting a contoured surface confronting an opposed wall surface of the other of said molds, said contoured surface being so shaped and disposed as to form an undercut region in an article to be molded, said auxiliary mold section being retractible to accommodate removal of such an article from said molds.

2. Apparatus according to claim 1, and further characterized in that said auxiliary mold section and said one mold include slidably interengaged rail and groove means positioned and arranged to provide for the recited movements between extended and retracted positions, and further by the inclusion of mechanism operable to move said auxiliary mold section between its extended and retracted position.

3. Apparatus according to claim 2, and characterized in that said mechanism comprises: bell crank means mounted for pivotation on said one mold; a link pivotally affixed at its one end to said auxiliary mold section and at its other end to one arm of said bell crank means; and motor means coupled to the other arm of said bell crank means for selectively rotating the latter in one or the other direction to provide the recited movements of said auxiliary mold section.

* * * * *